United States Patent

[11] 3,609,758

[72] Inventor David A. Buesing
Byron, Minn.
[21] Appl. No. 821,376
[22] Filed May 2, 1969
[45] Patented Sept. 28, 1971
[73] Assignee International Business Machines Corporation
Armonk, N.Y.

[54] KEYBOARD ENTRY DEVICE
10 Claims, 3 Drawing Figs.

[52] U.S. Cl. .......... 340/365, 178/17 C, 200/61.42, 235/145 R
[51] Int. Cl. .......... G06f 3/02
[50] Field of Search .......... 340/365, 337; 200/61.42; 235/145 R, 146; 178/17 C, 79, 87

[56] References Cited

UNITED STATES PATENTS

| | | | |
|---|---|---|---|
| 407,581 | 7/1889 | Dewey .......... | 178/87 X |
| 2,947,090 | 8/1960 | Levin et al. .......... | 178/87 X |
| 3,022,501 | 2/1962 | Seigle .......... | 340/365 |
| 3,462,549 | 8/1969 | Hamilton .......... | 178/18 |

*Primary Examiner*—Robert L. Richardson
*Attorneys*—Hanifin and Jancin and Robert W. Lahtinen

ABSTRACT: A hand-held keyboard data entry device including an actuator for entry of data and the operation of functional controls. The keyboard utilizes a diaphragm switch matrix to provide a compact keyboard switch arrangement which is operated by exertion of minimum forces. The actuator includes a switch means which must be operated in addition to the actuation of a selected data entry switch to effect transmission of data to an associated data receiving unit. Further the actuator generates an audible sound which indicates to an operator that the data has been entered.

INVENTOR

DAVID A. BUESING

BY

ATTORNEY

KEYBOARD ENTRY DEVICE

BACKGROUND OF THE INVENTION

This invention pertains to keyboard entry devices and more specifically to a portable keyboard entry device.

A small keyboard data entry device is frequently advantageous either as a standby unit for substitution when a regularly used keyboard entry unit of a data-handling system is disabled or to afford protability in an environment where the ability to use a readily portable keyboard entry station is particularly desirable.

The provision of a full numeric keyboard entry device with accompanying functional controls in a miniaturized and truly portable form has been accomplished in the device of the instant utilizing a diaphragm switch matrix. In the embodiment illustrated and described the keyboard member is hand held including 16 selectively operably data entering switch elements of which 10 provide the numeric characters arranged in a standard 10 key keyboard arrangement and the remaining six are associated function switches.

Since it would be easy to damage the diaphragm structure if any selected object or stylus-type device were used to operate the keyboard switches an actuating device is supplied for operating the keyboard switches. This actuator is provided with a cooperating switch structure which must operate in concert with the keyboard switches to enter data, thereby making use of the actuator mandatory. The switching device also produces an audible sound upon operation which, since a greater force is required to operate the actuator switch than the selected keyboard switch, assures the operator that entry of data has been effected. Accordingly the problem of feel or assurance that the switch has operated that is associated with the operation of diaphragm switches is overcome. Further, provision is made for the presence of a light that flashes each time a data switch is activated to produce a visible as well as audible indication of data entry.

DETAILED DESCRIPTION

Figure 1:
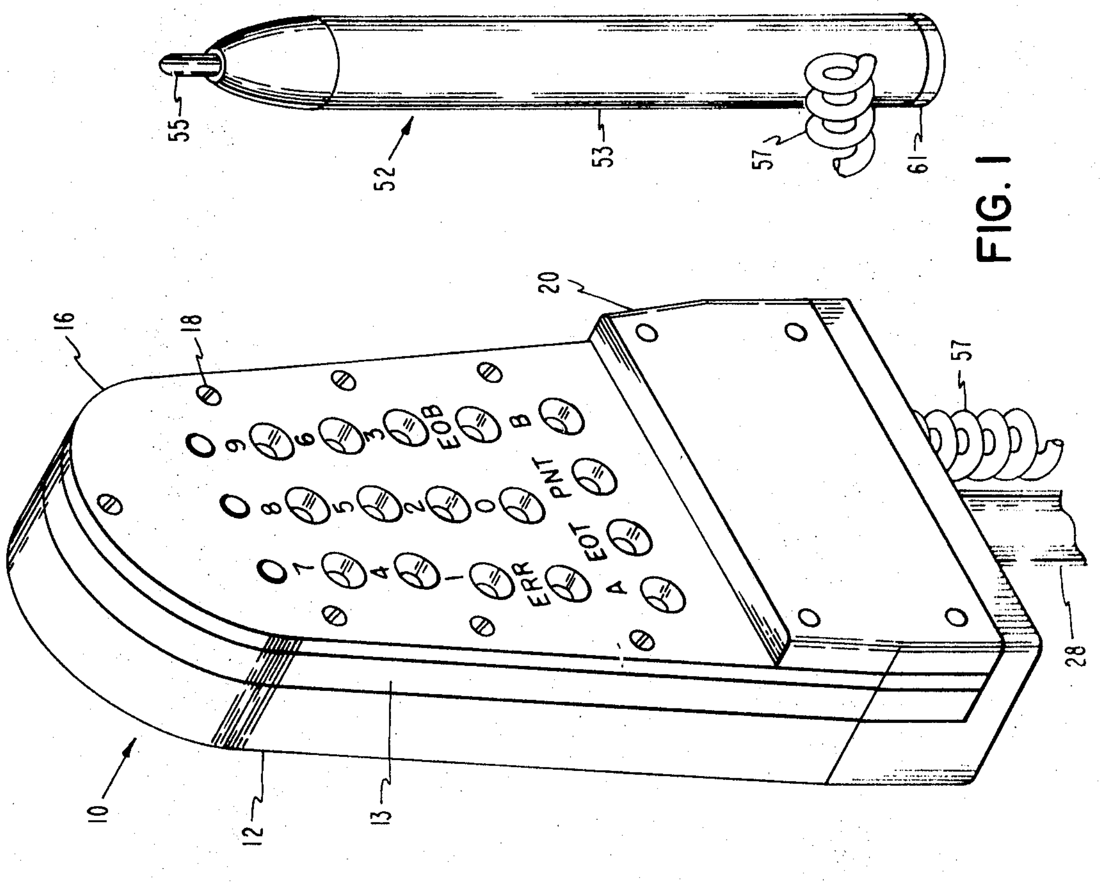
FIG. 1 is an isometric view of the keyboard and actuator of this invention with the connecting cable portions interrupted
Figure 2:
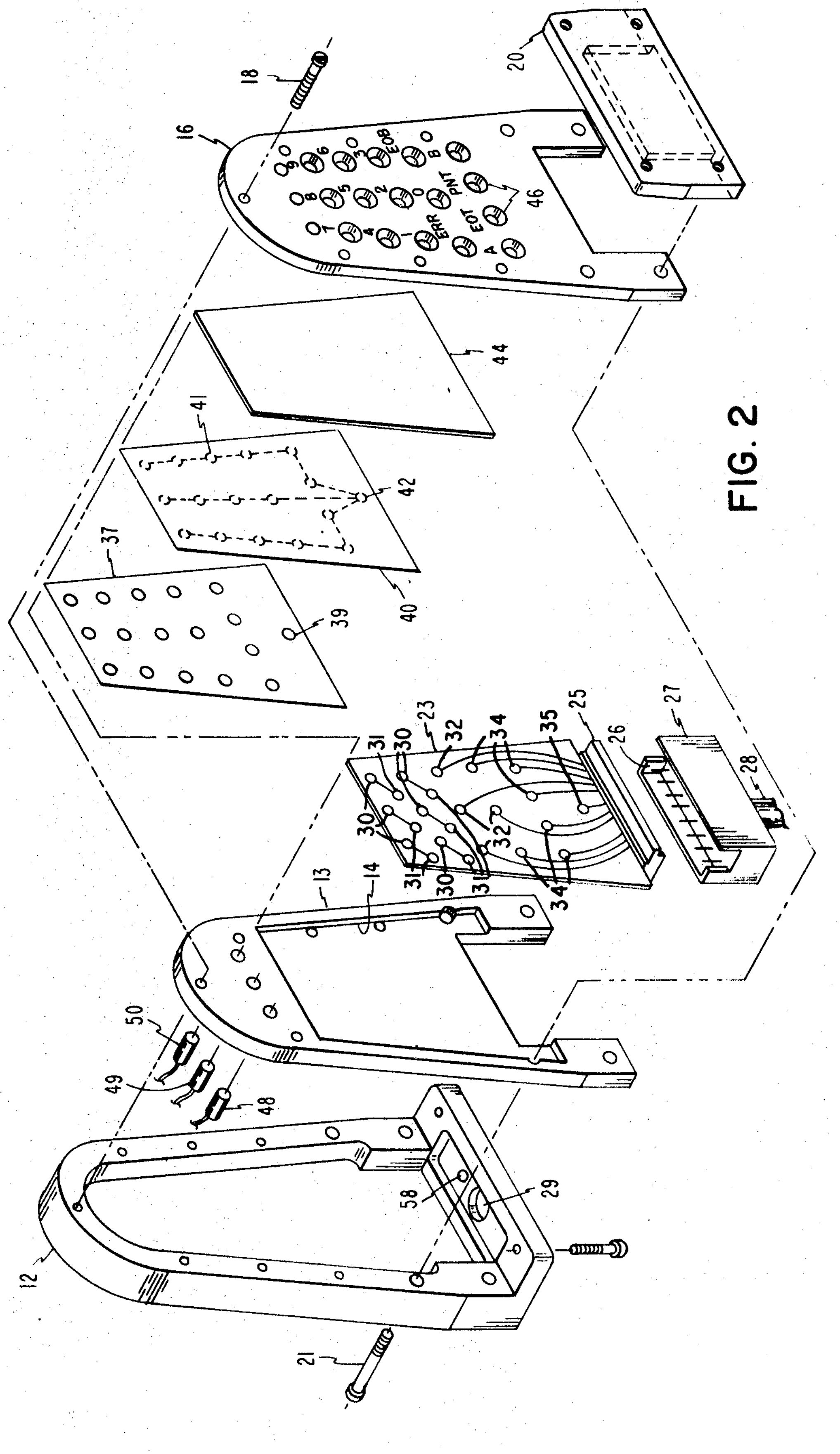
FIG. 2 is an exploded isometric view of the keyboard structure of FIG. 1 with a portion of the structure shown in hidden view.

Referring to the drawings the keyboard 10 is shown assembled in FIG. 1 and in exploded disassembled form in FIG. 2. The operating portions are enclosed in a housing which includes a back panel 12 that provides the principal structural support. An intermediate panel 13 includes a recess 14 for receiving the diaphragm switch assembly which is retained by the front panel 16 with the three panel sections secured together by a series of filister head screws 18. An escutcheon plate 20 secured by filister head screws 21 completes the housing enclosure.

Within the housing recess 14 is mounted the diaphragm switch assembly including a circuit board 23 which has a printed circuit on each side with circuit elements terminating in a dual row of terminals in the socket 25. Socket 25 is received in the recess 26 of plug 27 which terminates a cable 28 entering the housing through aperture 29 to connect the keyboard 10 to the associated data receiving apparatus. Contacts 30, 32 provide portions of the 10 numeric switch elements and six contacts 34 provide function switch elements, while contacts 35 provide for connection of the common circuit described below. Contacts 30 are each connected to a respective terminal 31 which is plated through an aperture in the card to enable the electrical connection to the socket terminal bank to be made along the opposite surface of the card.

Overlying circuit board 23 is a punched mylar sheet 37 having contacts 30, 32 and 34 at an aperture 39 overlying contact 35 to connect the cooperating circuits to the terminal provided socket 25. Overlying the punched mylar separator 37 is a printed mylar sheet 40 having a series of 16 contacts 41 respectively confronting the corresponding circuit board numeric and function switch element contacts 30, 32 and 34 and spaced therefrom by the separator 37. Contacts 41 are connected one to another and to a common contact 42 which is aligned with a circuit board common contact 35 and would normally be spaced therefrom the separator 37. However an aligned embossment (not shown) on the rear surface of the front panel 16 depresses the diaphragm and retains the contacts 42 and 35 in continuous pressure contact in the assembled condition. The printed circuit bearing mylar sheet 40 is separated from the front panel inner surface by a cover sheet 44 wear resistant material such as polyurethane or mylar. Front panel 16 has a series of frustoconical passages 46 respectively aligned with the pairs of confronting contacts of the diaphragm switch assembly to permit a force exerted by an object inserted in a selected passage opening to close the underlying contacts.

A series of three openings are provided in both the front and intermediate panels for the installation of light 48, 49 and 50 which connect to the socket 25 independent of the circuit board 23. The green light 48 when illuminated, indicates that the connected data receiving device is in a record mode and prepared to receive data. Clear light 49 indicates data entry whereby illumination of this light gives a visual indication of data entry in addition to the audible signal of the actuator switch. Red light 50 is indicative, when illuminated, of an error condition which alerts the operator to the necessity for detection and correction.

Figure 3:
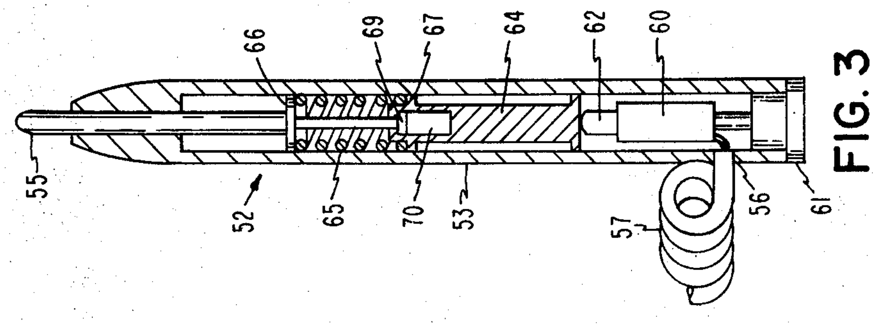
FIG. 3 is a generally axial view partly in section of the actuator member.

As seen in FIG. 3, the actuator 52 is a "pen like" structure both in size and in the manner held and operated. The device includes a housing or enclosure 53 from one end of which projects the switch actuator element 55. Adjacent the opposite end of the housing is an aperture 56 which admits the end of coil cord 57 that connects at its opposite through housing aperture 58 to terminal plug 27. Cord 57 connects to actuator switch 60 which is rigidly supported by a cap 61 and is operated by depressing operating plunger 62. Intermediate actuator 55 and switch operator 62 is a link 64 and compression spring 65. The link 64 is biased upward as seen in FIG. 3 to engage and move in unison with the switch operator 62. Compression spring 65 extends between actuator flange 66 and link flange 67. Actuator flange 69 and the link cylindrical opening 70 combine to form a lost motion connection whereby actuator 55 can move relative to link 64 by compressing link 65.

When the distal end surface of the actuator portion 55 is pressed against a surface, actuator portion 55, link 64 and spring 65 move upward initially depressing switch operator 62, since the switch operator restore spring is substantially less stiff than compression spring 65. If continued force is exerted beyond that necessary to bottom operator 62 compression spring 65 will yield to with a limited total force.

In operation the keyboard 10, held in one hand, is operated by the actuator 52 which is held in the operator's opposite hand in the same manner as a writing instrument. Data is entered into the device connected to cable 28 by inserting the actuation portion 55 into the selected opening 46 in cover panel 16 against the under lying diaphragm switch assembly and depressing the actuator axially to close both the selected contacts 41 with the confronting contact carried by circuit board 23 and the actuator switch 60. The actuator switch 60 generates an audible sound upon closing and since greater force is required to close actuator switch 60 than the selected diaphragm switch, the sound indicates that data has been entered. The possibility of accidentally entering data without the audible verifying sound is avoided by the necessity of actuating both the actuator switch and one of the diaphragm switches to effect the entry of data. This series connected elecstylus or other device to operate the keyboard thereby subjecting the diaphragm switch assembly to damage. In addition to the audible signal, each data entry operation causes clear light 49 to be illuminated giving a visual indication.

The actuator is further constructed to cause a predetermined force to fully retract actuating element 55 within enclosure 52. Accordingly when the actuator is inserted into one of the frustoconical openings 46 to close a selected pair of diaphragm contacts, since the housing cannot project through the lesser diameter portion of the cooperating frustoconical aperture the ability of the actuating portion 55 to retract limits the force that can be exerted by the actuator against the diaphragm switch assembly. Any further force is resisted by the front panel 16.

When data is to be entered, contact with the associated data receiving device is established by closing the bid switch B which polls the data receiving device. When the associated device is operational and both in the receiving mode and prepared to receive data from the keyboard, the green light 48 is illuminated indicating a continuing operational condition. When the light 48 is extinguished operational contact must by reestablished. In practice the operating mode will continue until a predetermined lapse of time automatically terminates the operating condition.

What is claimed is:

1. A keyboard data entry device comprising;
   a keyboard having a plurality of data entry switch elements;
   terminal means respectively connected to said switch elements for attaching said keyboard to a data receiving device;
   actuator means having a switch actuating portion operable to selectively operate said data entry elements; and
   actuator switch means carried by said actuator means which is activated by operation of said switch actuating portion and electrically connected with said keyboard device to effect transmission of data to said data receiving device upon operation of both said actuator switch means and selective operation of said data entry switch elements,
   said actuator switch means requiring a greater force to operate than the force required to operate said data entry switch elements and generating a human intelligible signal upon operation, whereby an operator can verify entry of data by observing said human intelligible signal.

2. The keyboard data entry device on claim 1 wherein said actuator means comprises a hand held actuator with a projecting, retractable element, said actuating element being retractable upon engagement with said keyboard device to close said actuator switch; and said human intelligible signal is an audible sound generated by said actuator switch upon closure.

3. The keyboard data entry device of claim 2 wherein said keyboard device comprises:
   a housing;
   a diaphragm switch matrix having a first series of contacts disposed on the surface of a circuit board;
   a second series of contacts on the surface of a flexible diaphragm in spaced confronting relation with respect to said first series of contacts and
   openings in said housing to permit said actuating element to exert a force on said diaphragm to close a selected pair of said confronting contacts.

4. The keyboard data entry device of claim 3 wherein said actuator further comprises:
   a link between said actuator switch and said actuating portion;
   a biased lost motion connection between said actuation portion and said link; and
   an actuator housing from which said actuator portion projects which exceeds the dimensions of said keyboard openings to thereby preclude entry of said actuator housing, whereby said biased lost motion connection limits the force which may be applied to said diaphragm and said actuator switch means.

5. A keyboard entry device comprising:
   a keyboard having a plurality of data entry electrical switch elements;
   a manual actuator for selectively operating said keyboard electrical switch elements; and
   actuator switch means carried by said actuator and electrically connected to said keyboard data switch elements to require operation of both a selected one of said data switch elements and said actuator switch means for entry of data by said keyboard, said actuator switch means generating an audible sound upon operation and said actuator switch means requiring a force for operation which exceeds the force necessary to operate said one of said data switch elements, whereby operation of said actuator switch means audibly verifies that a data entering switching operation has occurred.

6. The keyboard entry device of claim 5 wherein said keyboard is connected electrically to a data receiving apparatus which provides power and logic functions associated with said keyboard and said switch elements and switch means are normally open electrical contact structures which must be simultaneously closed to cause entry of data.

7. The keyboard entry of claim 5 wherein said data entry electrical switch elements comprise:
   a diaphragm switch assembly including a rigid circuit board carrying stationary contacts on one surface;
   a flexible diaphragm member overlying said circuit board having electrical contacts secured to the surface thereof and respectively aligned in confronting relation with said circuit board contacts; and
   spacer means for normally retaining the diaphragm contacts out of contact with the respectively confronting circuit board contacts.

8. The keyboard entry device of claim 7 wherein said keyboard and said manual actuator are electrically interconnected, portable, hand held devices and said keyboard further compromises a rigid housing having said diaphragm switch assembly mounted therein, said housing including a front panel with multiple aperture means formed therein respectively aligned with said contacts to permit entry of said manual actuator to effect selective actuation of said diaphragm switch assembly switch elements.

9. The keyboard entry device of claim 8 wherein said manual actuator includes an enclosure;
   a retractable actuator portion extending from said enclosure; and
   means connecting said actuator portion to said actuator switch means, said connecting means including a biased lost motion connection permitting further retraction of said actuator portion following operation of said actuator switch means.

10. The keyboard entry device of claim 9 wherein said enclosure engages said housing front panel when said actuator operates a selected switch element prior to maximum retraction of said actuator portion, whereby only a predetermined maximum force can be applied by said manual actuator to said diaphragm switch assembly.